Nov. 6, 1928.
E. PRATT
1,690,376
POWER TRANSMITTING UNIT FOR WELL RIGS
Filed June 22, 1926    2 Sheets-Sheet 1
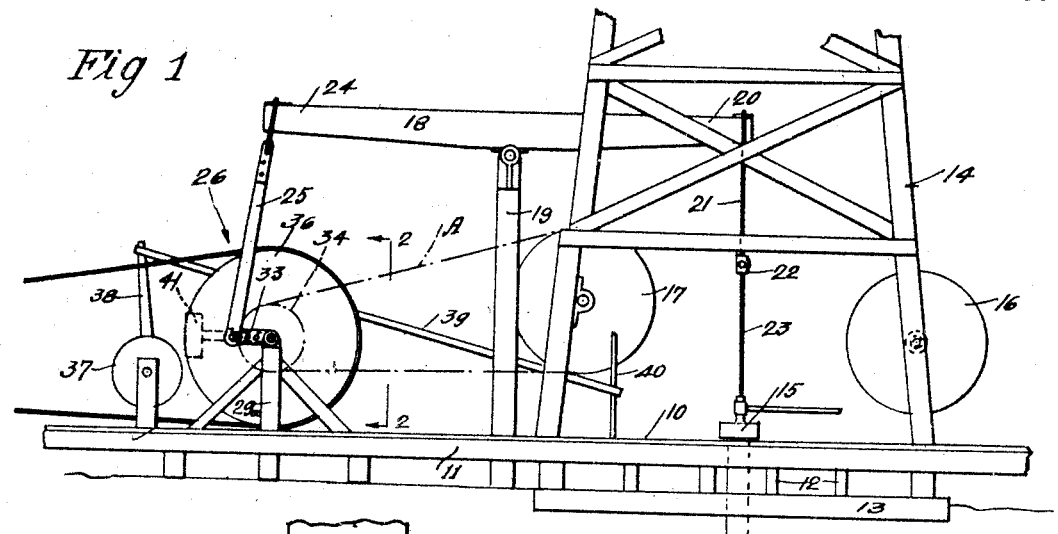
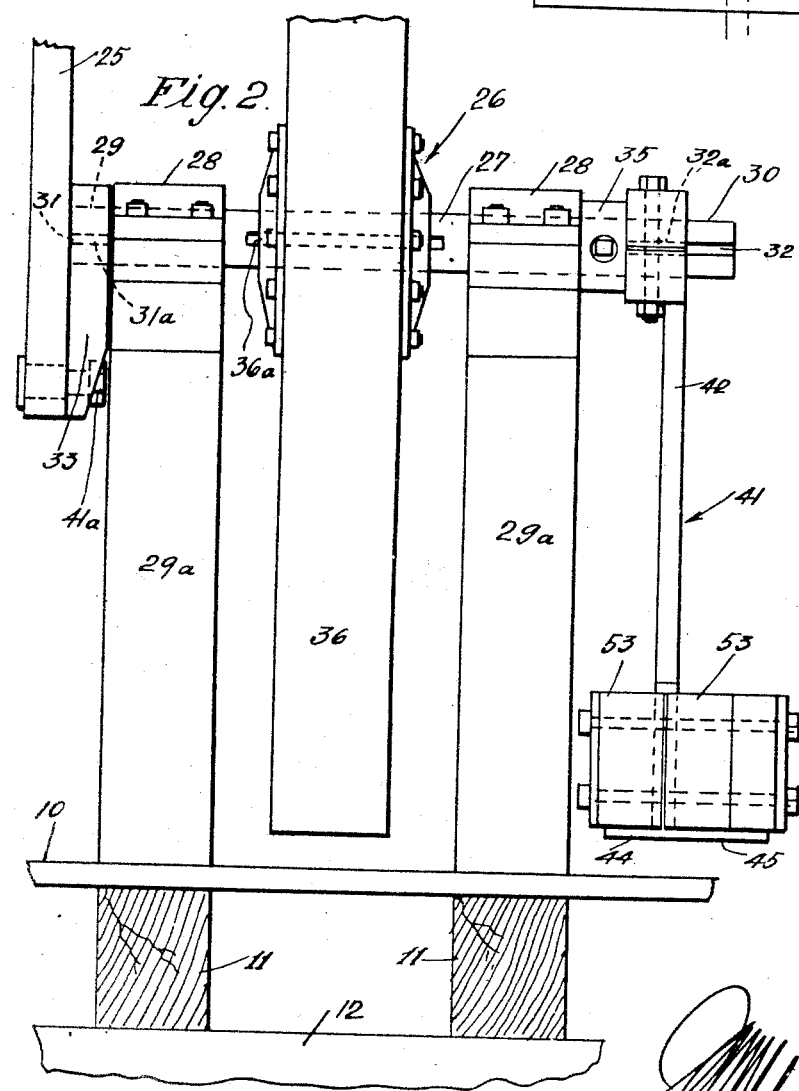
Inventor
Edward Pratt.
Attorney Nov. 6, 1928.  
E. PRATT  
1,690,376  
POWER TRANSMITTING UNIT FOR WELL RIGS  
Filed June 22, 1926  
2 Sheets-Sheet 2
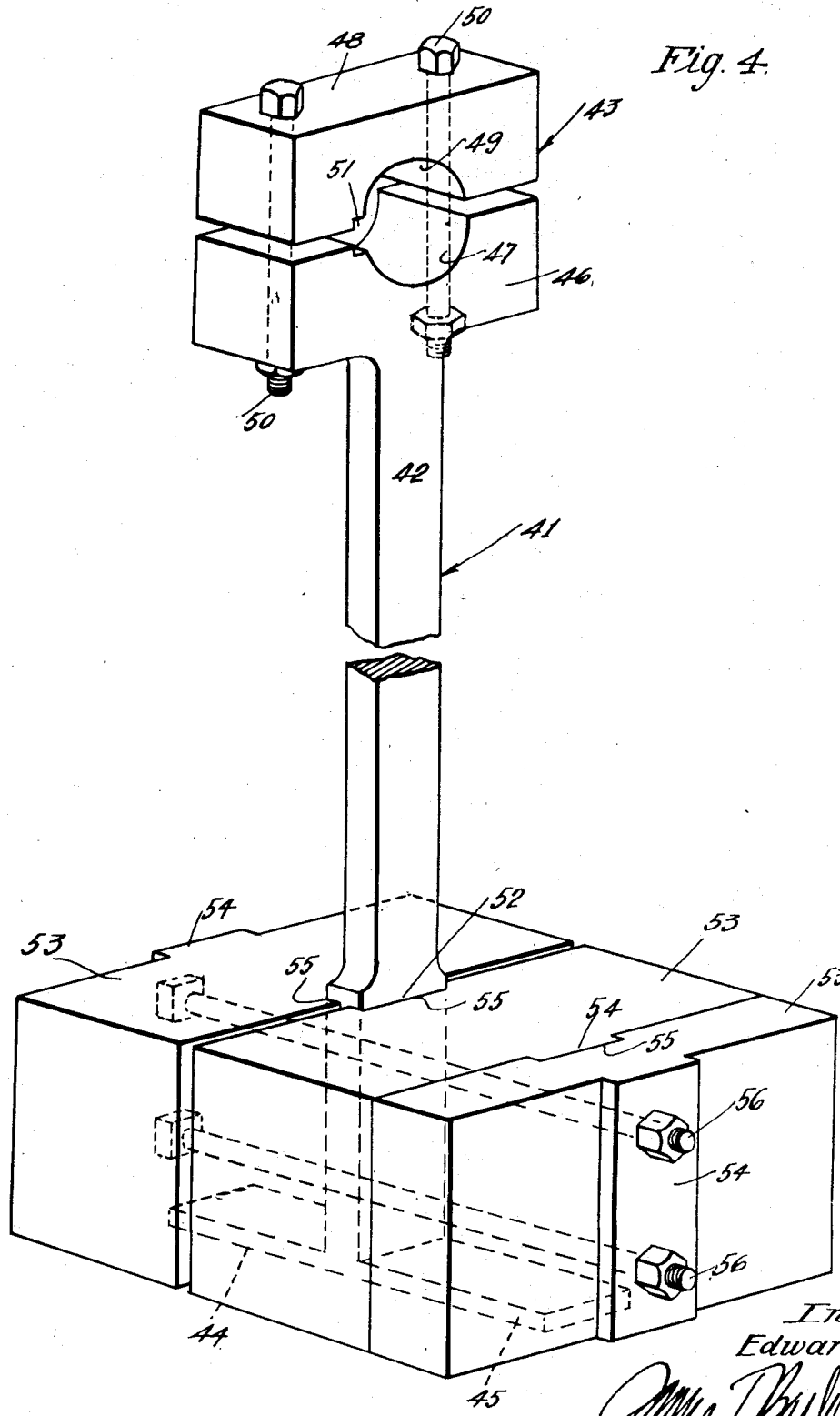
Inventor  
Edward Pratt.  
Attorney.

Patented Nov. 6, 1928.

1,690,376

UNITED STATES PATENT OFFICE.

EDWARD PRATT, OF TAFT, CALIFORNIA.

POWER-TRANSMITTING UNIT FOR WELL RIGS.

Application filed June 22, 1926. Serial No. 117,664.

This invention has to do with rigs used in drilling and operating oil and artesian wells, and is more particularly concerned with a power transmitting unit for such rigs.

The usual unit, to which my invention is applied, embodies a relatively large band wheel mounted upon a shaft which carries at one end a crank, and, usually, at the other end a clutch or tug wheel. The band wheel is belted to a drive shaft and hence acts as a medium for transmitting power from said drive shaft to both the crank and tug wheel. During well drilling and cleaning operations, the unit is employed for transmitting power to the various cable spooling elements such as the sand-reel and bull and calf wheels. At such times the walking beam is, of course, to be inoperative, the pitman between it and the shaft being disconnected. Then when the walking beam is to be reciprocated, the crank and pitman are reconnected while the drive connections between the band wheel shaft and the reeling elements are rendered inoperative.

The weight of the sucker rods and oil load at the work end of the walking beam is very considerable, and the smoothness and ease of operation of the pumping apparatus is greatly increased if this load be counterbalanced, as will be readily understood. Such counterbalancing also reduces the wear on the various driving elements since it eliminates to a great extent the jerky movements and wear and tear incident to starting and stopping the load at the stroke ends. While the load may be counterbalanced by placing considerable weight on the power arm of the walking beam, such an expedient is not desirable, for reasons that are well understood by workers in the field. It has been found much more satisfactory to associate the counterbalance with the band wheel, usually by detachably fixing weights directly to the wheel, the weights being detached from the wheel when the unit is employed for hoisting purposes since the counterbalance would otherwise interfere with smooth operation rather than contribute to it. I have found that even more satisfactory results may be obtained by fixing the counterweight directly to the band wheel shaft and where tug wheels are used to substitute the counterweight for such wheels, preferably using the same key for holding either the tug wheel or counterweight from rotation with respect to the shaft.

The nature of the connection between the counterweight arm and the band wheel shaft is such as will permit the ready attachment or detachment of the arm, and it will be understood any expedient which reduces the time during which an oil rig is idle is one of great importance in connection with oil well operations.

I have devised a peculiarly effective type of counterbalance, but this may be discussed to better advantage in connection with the following detailed specification, reference being had to the accompanying drawings in which:

Fig. 1 is a somewhat conventional view of an oil well rig showing my invention applied to a power transmitting unit thereof;

Fig. 2 is an enlarged fragmentary elevation as viewed from the position of line 2—2 of Fig. 1;

Fig. 3 is a fragmentary view of Fig. 2 as viewed from the right thereof; and

Fig. 4 is a perspective view of the preferred type of counterbalance.

In Fig. 1 I have illustrated a portion of a usual well rig, the numeral 10 designating a platform on stringers 11, the latter being supported on side sills 12 and mud sills 13. Derrick 14 rises from platform 10 and is disposed over well 15 in the usual manner. Bull wheel 16 and calf wheel 17, used, respectively, for spooling the drilling cable and casing line, are rotatably supported by the derrick timbers in the usual manner. Walking beam 18 is mounted for oscillation on top Samson post 19 and is adapted at its work end 20 for connection, through cable 21 and grip 22, to polish rod 23, the latter being connected in the usual manner to a string of sucker rods and pump cylinder (not shown). From the power end 24 of beam 18 extends the usual pitman 25.

The power transmitting unit is indicated generally at 26 and is shown in detail in Fig. 2. This unit consists of a band wheel shaft 27 journaled in boxes 28 on top the horizontally spaced jack posts 29$^a$. Shaft 27 extends outwardly beyond each jack post as at 29 and 30, these extensions ordinarily have aligned keyways 31 and 32 for the reception of keys 31$^a$ and 32$^a$, respectively, whereby crank 33 is held against rotation with respect to extension 29, and the tug wheel or other power transmitting element 34 is held against rotation with respect to extension 30. While it is unimportant to this invention as to the precise manner in which shaft 27 is held against movement longitudinally, I have here shown crank 33 and collar 35, the latter being on extension 30, engaging the outer faces of the bearings to hold the shaft against end play. Band wheel 36 is secured to shaft 27 at a point approximately mid-way between the jack-posts, and is held against rotation with respect thereto in the usual manner, as, for instance, by key 36ª.

A sand reel 37, which is, of course, not a part of the power transmitting unit, is adapted to be swung by crank 38, reach rod 39, and operating handle 40 to and from a position of frictional engagement with the band wheel in the usual manner.

When unit 26 is to be used for transmitting power to the sand reel or to the bull and calf wheels, pitman 25 is disconnected from crank 33, the crank pin connection 41ª between crank and pitman being of a type to render such detachment easy. The pitman is drawn clear of the crank so there will be no interference with free rotation of the latter. If the bull or calf wheel is to be rotated, driving connection between such wheels and shaft 27 is made usually through such means as wheel 34, or its equivalent, on shaft 27 and belt or chain A. At such times, there is no need for a counterbalance since the only off center weight on the shaft is that of crank 33, and this is not sufficient to warrant counterbalancing. Any weight sufficient and disposed to counterbalance the load on beam 18, when the latter is connected with shaft 27 through pitman 25 and crank 33, would interfere with the smooth rotation of the band wheel when pitman 25 is disconnected.

When disconnection is made between shaft 27 and the various reeling devices, and reconnection is made between the shaft and beam 24 through pitman 25, it is then highly desirable that the load on end 20 of beam 18 be counterbalanced, as is well understood.

I find that the most efficient point of application of this counterweight is on shaft extension 30, the weight then being spaced substantially the same distance from band wheel 36 as is crank 33. This point of application is further advantageous in that extension 30 is readily accessible. Furthermore, the tug wheel 34, or its equivalent, may be removed from extension 30 and the same key 32ª which sufficed to hold the tug wheel positively against rotation on the shaft may be employed for holding the counterbalance in the same manner.

I have indicated my counterbalance generally at 41, and in its preferred form, the balance is made up of an arm 42, of substantially rectangular cross section, a split clamp head 43 at one end of the arm and oppositely disposed transverse extensions 44 and 45 at the other end, though it will be understood my broader claims are not limited to a counterbalance fashioned in this particular manner.

Split head 43 is made up of enlargement 46, integral with arm 42 and having at its upper side a groove 47 adapted to fit shaft extension 30, and a block 48, preferably entirely detachable from enlargement 46, and having a groove 49 in its lower face which is substantially complementary to groove 47 so shaft extension 30 may be taken therebetween. Bolts 50 pass through enlargements 46 and block 48, and are adapted to be taken up to clamp the arm directly to the shaft extension.

It is preferable that there be provided means for holding the arm positively against rotation with respect to shaft 27, and it is convenient to employ a key 32ª for this purpose, though this is not essential to the invention, considered in its broader aspects. Thus, head 43 may be provided with keyway 51 to take key 32ª, and since this key is usually in alinement with key 31ª and since it is essential to the proper counterbalancing effect that arm 42 extend in substantially radial parallelism with crank 33 and at the same side of the shaft center thereas, ordinarily keyway 51 will be spaced 90° from the longitudinal axis of arm 42, and it then comes half in enlargement 46 and half in block 48, as clearly shown in Figs. 3 and 4.

Preferably, extension 45, which faces outwardly from the jack post, is somewhat longer than extension 44, since the length of the latter is limited inasmuch as there must be left clearance between it and the adjacent jack post. Preferably, also, extensions 44 and 45 and that portion 52 of arm 42 which lies immediately adjacent the extensions are somewhat wider than the medial portion of arm 42, portion 52 and the extensions being adapted to take weights 53 in varying number or of varying relative sizes. Preferably, these weights or sections are provided with aligned tongues 54 and grooves 55 on their opposite faces, the width of the tongue and groove being substantially that of portion 52 and of an extent, measured across the tops of the weights, of a little less than half the thickness of portion 52.

The weights are rested in end engagement upon extensions 44 and 45 and may be moved inwardly toward arm 42 and interlocked with one another and with portion 52 through the tongues and grooves. Bolts 56 extend through portion 52 and the weights to hold them clamped together and to the arm. Extensions 45 serve not only to give added effective weight to the counterbalance, but also relieve bolts 56 from a certain amount of strain.

The number of weight sections applied to the arm depends, of course, upon a given situation, but it will be seen that the total effective weight of the counterbalance may be readily and easily changed by varying the sections either in number or size.

It will be seen that when the rig is again to be used for reeling purposes, it is a matter of little difficulty to loosen the clamp head and remove the counterbalance; and the saving of time effected by the easy attachment and detachment of the counterbalance is a factor of real importance, as is well understood by those skilled in the art.

It will be understood the drawings and description are to be considered merely as illustrative of and not restrictive on the broader claims appended hereto, for various changes in design, structure and arrangement may be made without departing from the spirit and scope of said claims.

I claim:

1. A power transmitting unit for well rigs embodying a rotatably supported shaft, a band wheel fixed on the shaft, a crank fixed on the shaft, and a counterbalance directly and detachably fixed to the shaft; said counterbalance embodying an arm in substantially radial parallelism with the crank and detachably fixed at one end to the shaft, a pair of oppositely projecting, transverse extensions near the other end of the arm, and detachable weights fixed to the arm at opposite sides thereof and in end engagement with the extensions.

2. A power transmitting unit for well rigs embodying a rotatably supported shaft, a band wheel fixed on the shaft, a crank fixed on the shaft, and a counterbalance directly and detachably fixed to the shaft, a pair of oppositely projecting, transverse extensions near the other end of the arm, weights arranged on the arm at opposite sides thereof and in end engagement with the extensions, and means common to the weights detachably connecting them to the arm.

3. A power transmitting unit for well rigs embodying a rotatably supported shaft, a band wheel fixed on the shaft, a crank fixed on the shaft, and a counterbalance directly and detachably fixed to the shaft, a counterbalance arm detachably fixed at one end to the shaft and substantially in radial parallelism with the crank, a weight having a groove extending across one of its faces, said weight being applied to the arm in a manner to take the arm within the groove. and means for detachably holding the weight to the arm in its applied position.

4. A counterbalance for the purpose described, embodying an arm, shaft attachment means at one end of the arm, a transverse extension near the other end of the arm, and a detachable weight fixed to the arm and in end engagement with the extension.

5. A counterbalance for the purpose described, embodying an arm, shaft attachment means at one end of the arm, a pair of oppositely projecting, transverse extensions near the other end of the arm, and detachable weights fixed to the arm at opposite sides thereof and in end engagement with the extensions.

In witness that I claim the foregoing I have hereunto subscribed my name this 8th day of June, 1926.

EDWARD PRATT.